(12) United States Patent
Cohen et al.

(10) Patent No.: US 12,413,514 B2
(45) Date of Patent: Sep. 9, 2025

(54) PROCESSING DATA IN A DISTRIBUTED ROUTING SYSTEM

(71) Applicant: DRIVENETS LTD., Raanana (IL)

(72) Inventors: Ron Cohen, Ness Ziyona (IL); Evgeny Sandler, Herzliya (IL); Amir Krayden, Hertzelia (IL); Alexander Zilberman, Hadera (IL)

(73) Assignee: DRIVENETS LTD., Raanana (IL)

( * ) Notice: Subject to any disclaimer, the term of this patent is extended or adjusted under 35 U.S.C. 154(b) by 276 days.

(21) Appl. No.: 18/041,722

(22) PCT Filed: Jun. 29, 2021

(86) PCT No.: PCT/IL2021/050795
§ 371 (c)(1),
(2) Date: Feb. 15, 2023

(87) PCT Pub. No.: WO2022/038589
PCT Pub. Date: Feb. 24, 2022

(65) Prior Publication Data
US 2023/0300071 A1    Sep. 21, 2023

Related U.S. Application Data

(60) Provisional application No. 63/066,346, filed on Aug. 17, 2020.

(51) Int. Cl.
*H04L 45/586* (2022.01)
*H04L 49/15* (2022.01)

(52) U.S. Cl.
CPC ........ *H04L 45/586* (2013.01); *H04L 49/1507* (2013.01)

(58) Field of Classification Search
CPC ... H04L 45/586; H04L 49/1507; H04L 43/20; H04L 49/25; H04L 43/0876; H04L 43/065
See application file for complete search history.

(56) References Cited

U.S. PATENT DOCUMENTS

| | | |
|---|---|---|
| 2002/0174216 A1 | 11/2002 | Shorey et al. |
| 2005/0063385 A1 | 3/2005 | Wybenga et al. |
| 2015/0188798 A1* | 7/2015 | Mizrahi ................ H04L 45/245 370/252 |
| 2016/0173371 A1 | 6/2016 | Bays |
| 2019/0379576 A1 | 12/2019 | Narnakaje Venugopala et al. |
| 2020/0007405 A1 | 1/2020 | Chitalia et al. |
| 2020/0244575 A1* | 7/2020 | Sandler ................ H04L 45/583 |

* cited by examiner

*Primary Examiner* — Kibrom T Hailu
(74) *Attorney, Agent, or Firm* — FisherBroyes, LLP; Roger L. Browdy; Ronni S. Jillions

(57) ABSTRACT

A distributed routing system is provided for use in a communication network. The distributed routing system comprises a plurality of forwarding modules and a plurality of fabric modules. At least one counter located at at least one respective fabric module is configured to receive data relating to the number of packets being forwarded via physical and/or logical interfaces associated with at least two of the plurality of forwarding modules.

7 Claims, 1 Drawing Sheet

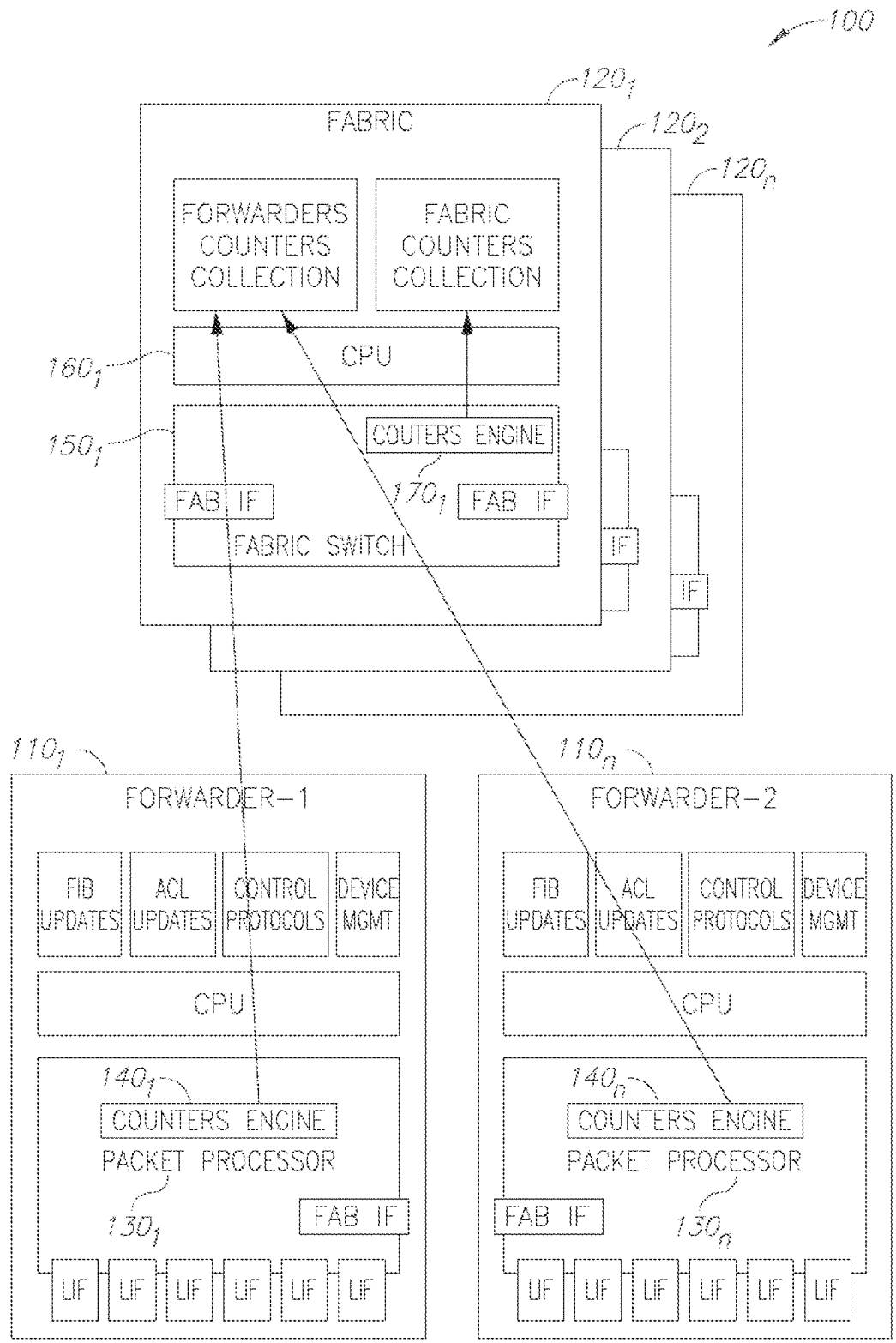

PROCESSING DATA IN A DISTRIBUTED ROUTING SYSTEM

TECHNICAL FIELD

The present disclosure relates generally to the field of networking, and in particular, to optimization of hardware resources.

Glossary

ACL—Access Control List—set of rules for allowing or denying packets to be forwarded via a device.
ASIC—Application-specific integrated circuits.
CPU—Central processing unit.
FIB—Forwarding Information Base—used by a routing device to select an interface for sending a packet.
FPGA—Field-Programmable Gate Array.
LIF—Logical interface.
LSP—Label Switched Path.
MPLS—Multiprotocol Label Switching.
RIB—Routing Information Base—used by a routing device to learn routes to other routing devices
VLAN—Virtual Local Access Network—A network or part of a network that operates separately from the Internet. VLAN is an approach that enables separating between networks operating within the same physical network.

BACKGROUND

A typical distributed routing platform is composed of one or more routing processors (e.g. for redundancy purposes), forwarding devices (according to the number of network interfaces in the routing platform), fabric devices, and a platform management network.

The routing processors are computing nodes that operate control plane protocols (e.g., operating routing protocols) and management plane protocols. The routing protocols are used to populate the routing information base (RIB) table. Eventually, a RIB table includes routes to all reachable destinations in the network.

The forwarding devices (forwarders) are typically based on packet processors, which may be data plane application-specific integrated circuits (ASIC) or field-programmable gate arrays (FPGA). Packet processors have multiple network interfaces. Each network interface can be segregated further to multiple logical interfaces (LIFs). A LIF can be presented on the network interface as a VLAN, MPLS LSP, L3 tunnel, etc. Packet processors are configured to perform packet forwarding from one LIF to another. In addition to the packet processor, the forwarding device includes a CPU that runs a forwarding engine application. The forwarding engine application is responsible for maintaining the FIB, ACL, and other packet processor resources according to the routing engine directives. The forwarding engine application reports the status of the forwarder, such as the network interfaces state, counters, etc. to the routing engine. In addition, the forwarding engine traps routing protocol packets received from the packet processor and forwards them to the routing engine.

The fabric devices are typically based on fabric switches, which may be data plane ASIC or FPGA chips. Fabric switches are used for the interconnection of forwarding devices to forward packets from the LIF that resides on one forwarder to a LIF that resides on another forwarder. In addition to the fabric switch, the fabric device includes a CPU that runs a fabric engine application. Fabric engine application is responsible for reporting the status of the fabric switch, such as fabric interfaces state, counters, etc. to the routing engine.

In order to enable implementing traffic telemetry and troubleshooting tools, the packet processors on the forwarding devices maintain counters for each physical and logical interface, counting the number of packets being forwarded via the physical or logical interfaces, respectively. The forwarding engine applications must collect on a periodical basis the current outcome of the counters from the packet processors and fabric switch. It is important that the collection period remains a short period for the following reasons:
 To avoid counter wrap around due to high data plane rates; and
 To enable provisioning of accurate and up-to-date telemetry to the user.

The packet processor may support thousands of logical interfaces (LIFs) and may maintain hundreds of counters for each LIF. With that many interfaces and counters, the collection process becomes a cumbersome process and extremely CPU processing intensive.

The solution provided by the present disclosure proposes a new distributed system in which the computing load of the forwarding engines (e.g. counters' maintenance) is reduced while still maintaining the distributed system's functionalities as before.

SUMMARY

The disclosure may be summarized by referring to the appended claims.

It is an object of the present disclosure to provide a novel distributed system which enables effective monitoring of statistics collection (PM collection) from nodes comprised in that distributed routing system.

It is another object of the present disclosure to provide a novel distributed routing system in which CPU intensive tasks are offloaded from the forwarding devices, while the distributed routing system still maintains its functionalities as before.

It is another object of the present disclosure to provide a novel distributed routing system wherein the counter collection logic for the forwarding devices is run remotely on fabric devices.

It is another object of the present disclosure to provide a novel distributed routing system wherein the counters collection load is shifted from forwarding engines to fabric engines.

Other objects of the present disclosure will become apparent from the following description.

According to a first embodiment of the present disclosure there is provided a distributed routing system for use in a communication network comprising a plurality of forwarding modules and a plurality of fabric modules, and wherein at least one counter located at at least one respective fabric module is configured to receive data relating to number of packets being forwarded via physical and/or logical interfaces associated with at least two of the plurality of forwarding modules.

In accordance with another embodiment, the at least one counter located at at least one respective fabric module is configured to receive data relating to the number of packets being forwarded via all physical and/or logical interfaces associated with the at least two of the plurality of forwarding modules.

By yet another embodiment each of the plurality of forwarding modules and the plurality of fabric modules is a separate physical device (e.g. a node in the distributed routing system).

According to still another embodiment, a CPU associated with at least one counter located at a respective fabric module is configured to remotely retrieve the data relating to the number of packets being forwarded via physical and/or logical interfaces associated with the at least two forwarding modules.

By yet another embodiment, the data relating to number of packets being forwarded via physical and/or logical interfaces associated with the at least two forwarding modules, is exported to a counter engine of a fabric switches associated with a respective fabric module, as a data plane packet.

According to another embodiment, the at least one fabric module is further configured to execute a counter collection application for retrieving counter values from a counter engine located at that at least one fabric module.

In accordance with still another embodiment the data relating to the number of packets being forwarded via physical and/or logical interfaces associated with the at least two forwarding modules is processed at the at least one fabric module separately from processing the counter values retrieved from the counter engine located at the at least one fabric module.

BRIEF DESCRIPTION OF THE DRAWINGS

The accompanying drawing, which is incorporated herein and constitute a part of this specification, illustrates an embodiment of the disclosure and, together with the description, serve to explain the principles of the embodiments disclosed herein.

FIG. 1 illustrates a schematic view of a part of a distributed routing system construed in accordance with an embodiment of the present invention.

DESCRIPTION OF EXEMPLARY EMBODIMENTS

Some of the specific details and values in the following detailed description refer to certain examples of the disclosure. However, this description is provided only by way of example and is not intended to limit the scope of the invention in any way. As will be appreciated by those skilled in the art, the claimed distributed routing system may be implemented by using other devices that are known in the art per se. The scope of the invention can be summarized by referring to the appended claims.

As discussed above, the typical prior art solution for implementing traffic telemetry is, to configure the packet processors associated with the forwarding devices (forwarders) so as to maintain a counter for each physical and logical interface. In order to comply with this task, the forwarding engine applications must collect, on a (short) periodical basis, the current value of the counters from the packet processors. However, such a packet processor may support thousands of logical interfaces (LIFs) and may maintain hundreds of counters for each LIF. With that many interfaces and counters, the collection process becomes a very cumbersome task and extremely CPU intensive. In view of the fact that the forwarding engine application includes several CPU intensive functions, where supporting the counter collection function is only one of them, the inventors found that the CPU performance of the forwarding device could be improved by reducing its CPU processing load, thereby enabling improved performance monitoring statistics collection (PM collection) from nodes located within the distributed routing system. To do that, the solution provided by the present invention proposes to offload the counter collection task from the CPUs of the forwarding devices to a software logic that runs on a fabric device (a fabric module). When a distributed routing system includes multiple fabric devices, each fabric device may be configured to collect the counters' values of different groups of forwarding devices.

FIG. 1 illustrates a schematic view of a part of a distributed routing system 100 which comprises a plurality of forwarding devices ($110_1$, $110_2$ ... $110_n$) (forwarding modules) and a plurality of fabric devices ($120_1$, $120_2$ ... $120_k$) (fabric modules). Packet processors ($130_1$, $130_2$ ... $130_n$) that reside on respective forwarding devices maintain counters ($140_1$, $140_2$ ... $140_n$) as part of respective on-chip blocks, which are configured to count the number of packets being forwarded via a physical or a logical interface with which that counter is associated. These counters are referred to herein as counter engines. The essentially same on-chip blocks mutatis mutandis may be located as part of the fabric switches ($150_1$, $150_2$ ... $150_k$) residing on respective fabric devices ($120_1$, $120_2$ ... $120_k$) or the data received from the forwarding devices ($110_1$, $110_2$ ... $110_n$) may be conveyed to and collected by a processor configured to collect the data received from these forwarding devices. The local CPUs ($160_1$, $160_2$ ... $160_k$) that reside on the fabric devices ($120_1$, $120_2$ ... $120_k$) run counter collection logics that are configured to remotely retrieve current values of the counter engines ($140_1$, $140_2$ ... $140_n$) located on forwarding devices packet processors ($130_1$, $130_2$ ... $130_n$). Remote access to retrieve data from the packet processors' counter engines ($140_1$, $140_2$ ... $140_n$) can be performed by using any one of various methods that are known in the art per se, such as for example a remote direct memory access (RDMA) or by exporting counter values of the packet processor to the counter engines of the fabric switches ($150_1$, $150_2$ ... $150_k$) as a data plane packet. In addition, the local CPUs ($160_1$, $160_2$ ... $160_k$) that reside on the fabric devices may run a counter collection logic that is configured to retrieve (read) the counters' values from the counter engines ($170_1$, $170_2$ ... $170_k$) located at the respective local fabric switches ($150_1$, $150_2$ ... $150k$).

After receiving the information at the fabric devices, it is processed and used for whatever tasks it is needed, such as for performance monitoring statistics collection from nodes comprised in the distributed routing system.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A distributed routing system for use in a communication network comprising a plurality of forwarding modules, each including a respective CPU, and a plurality of fabric modules, and wherein at least one counter located at at least one respective fabric module is configured to receive data relating to number of packets being forwarded via physical and/or logical interfaces associated with at least two of the plurality of forwarding modules, thereby shifting load collection of the number of packets being forwarded via physical and/or logical interfaces associated with at least two of the plurality of forwarding modules from the CPUs of said at least two forwarding modules, to be collected by a software logic that runs on a respective fabric module, and consequently enabling offloading CPU intensive tasks from said forwarding modules to be carried out by the software logic that runs on said respective fabric module, while said distributed routing system still maintains its original functionalities.

2. The distributed routing system of claim 1, wherein the at least one counter located at at least one respective fabric module is configured to receive data relating to the number of packets being forwarded via all physical and/or logical interfaces associated with said at least two of the plurality of forwarding modules.

3. The distributed routing system of claim 1, wherein each of the plurality of forwarding modules and the plurality of fabric modules is a separate physical device.

4. The distributed routing system of claim 1, wherein a CPU associated with at least one counter located at a respective fabric module is configured to remotely retrieve the data relating to number of packets being forwarded via physical and/or logical interfaces associated with said at least two forwarding modules.

5. The distributed routing system of claim 1, wherein the data received from at least two of the plurality of forwarding modules and relates to number of packets being forwarded via physical and/or logical interfaces associated with said at least two forwarding modules, is conveyed to and collected by a processor configured to collect data received from said at least two forwarding modules.

6. The distributed routing system of claim 1, wherein said at least one fabric module is further configured to execute a counter collection application for retrieving counter values from a counter engine located at said at least one fabric module.

7. The distributed routing system of claim 1, wherein said number of packets received is collected by a software logic that runs on a fabric module, and wherein each of said fabric modules comprised in said distributed routing system is configured to collect number of packets received associated with a plurality of forwarding modules.

* * * * *